(12) United States Patent
Han et al.

(10) Patent No.: US 8,145,248 B2
(45) Date of Patent: Mar. 27, 2012

(54) APPARATUS AND METHOD FOR UPLINK BEAMFORMING AND SPACE-DIVISION MULTIPLE ACCESS (SDMA) IN MULTIPLE INPUT MULTIPLE OUTPUT (MIMO) WIRELESS COMMUNICATION SYSTEMS

(75) Inventors: Ki-Young Han, Yongin-si (KR); Sang-Woo Lee, Suwon-si (KR); June Moon, Seoul (KR); Byoung-Ha Yi, Seoul (KR); Cheol Mun, Suwon-si (KR)

(73) Assignees: Samsung Electronics Co., Ltd., Suwon-si (KR); Chungju National University Industry-Academic Cooperation Foundation, Chungju-si (KR)

( * ) Notice: Subject to any disclaimer, the term of this patent is extended or adjusted under 35 U.S.C. 154(b) by 505 days.

(21) Appl. No.: 12/407,951

(22) Filed: Mar. 20, 2009

(65) Prior Publication Data
US 2009/0239565 A1 Sep. 24, 2009

(30) Foreign Application Priority Data
Mar. 21, 2008 (KR) .......................... 10-2008-0026382

(51) Int. Cl.
H04B 7/00 (2006.01)
H04B 1/38 (2006.01)
H04L 27/00 (2006.01)
H04W 4/00 (2009.01)

(52) U.S. Cl. .................. 455/512; 455/562.1; 455/67.11; 375/299; 370/329

(58) Field of Classification Search ............... 455/67.11, 455/69, 512, 513, 562.1, 67.14, 507, 509, 455/561; 375/267, 299; 370/329
See application file for complete search history.

(56) References Cited

U.S. PATENT DOCUMENTS

| | | | |
|---|---|---|---|
| 6,963,742 B2 * | 11/2005 | Boros et al. .................... 455/424 |
| 2007/0015545 A1 * | 1/2007 | Leifer et al. ................ 455/562.1 |
| 2007/0064830 A1 * | 3/2007 | Choi et al. .................... 375/267 |
| 2009/0252250 A1 * | 10/2009 | Heath et al. .................... 375/267 |
| 2010/0104038 A1 * | 4/2010 | Stager et al. .................... 375/267 |
| 2010/0202548 A1 * | 8/2010 | Sanayei ......................... 375/260 |
| 2010/0246494 A1 * | 9/2010 | Sanayei ......................... 370/328 |
| 2011/0080964 A1 * | 4/2011 | Shamsi et al. ................. 375/260 |
| 2011/0164691 A1 * | 7/2011 | Thomas et al. ................ 375/259 |
| 2011/0228735 A1 * | 9/2011 | Lee et al. ....................... 370/329 |

* cited by examiner

Primary Examiner — Don Le
(74) Attorney, Agent, or Firm — Jefferson IP Law, LLP

(57) ABSTRACT

An apparatus and method for beamforming of a terminal in a Multiple Input Multiple Output (MIMO) wireless communication system are provided. The method includes transmitting sounding signals beamformed through a plurality of beamforming weight vectors in sequence, receiving control information indicative of an uplink weight vector determined by a base station and a maximum channel quality value using the sounding signals and transmitting a transmit signal beamformed with the uplink weight vector via a plurality of antennas.

20 Claims, 7 Drawing Sheets

APPARATUS AND METHOD FOR UPLINK BEAMFORMING AND SPACE-DIVISION MULTIPLE ACCESS (SDMA) IN MULTIPLE INPUT MULTIPLE OUTPUT (MIMO) WIRELESS COMMUNICATION SYSTEMS

PRIORITY

This application claims the benefit under 35 U.S.C. §119 (a) of a Korean patent application filed in the Korean Intellectual Property Office on Mar. 21, 2008 and assigned Serial No. 10-2008-0026382, the entire disclosure of which is hereby incorporated by reference.

BACKGROUND OF THE INVENTION

1. Field of the Invention

The present invention relates to a multiple-input multiple-output wireless communication system. More particularly, the present invention relates to an apparatus and a method for an uplink beamforming and an uplink Space-Division Multiple Access (SDMA) based on the beamforming in a multiple-input multiple-output wireless communication system.

2. Description of the Related Art

The rapid growth of the wireless mobile communication market has resulted in a greater demand for various multimedia services in a wireless environment. Recently, to provide such multimedia services, which include a large amount of transmit data and increased data delivery rate, research is being conducted on Multiple Input Multiple Output (MIMO) wireless communication systems that provide a more efficient use of limited frequencies.

A MIMO wireless communication system can transmit a signal over independent channels per antenna and thus increase transmission reliability and data rate without the use of an additional frequency or additional transmit power, compared to a single-input single-output system. The MIMO system can be extended to a MIMO system in a multi-user environment supporting a plurality of users. That is, the MIMO system in the multi-user environment enables the multiple users to share spatial resources ensured by the multiple antennas, thus further improving the spectral efficiency.

A Spatial Multiplexing (SM) of the MIMO wireless communication system techniques builds a plurality of spatial subchannels between one transmitter and one receiver and independently transmits data per spatial subchannel, to thus raise the data transmission capacity in each link. A Space Division Multiple Access (SDMA) technique can increase the transmission capacity of the system by transmitting data signals to multiple receivers at the same time. Provided that a Base Transceiver Station (BTS) includes $n_T$-ary transmit/receive antennas and an Access Terminal (AT) includes $n_R$-ary transmit/receive antennas, the BTS can use the $n_T$-ary transmit antennas and the AT can use the $n_R$-ary receive antennas for downlink SM and SDMA, and the AT can use the $n_R$-ary transmit antennas and the BTS can use the $n_T$-ary receive antennas for uplink SM and SDMA.

However, unlike the BTS that is not limited in its use of power, the AT is subject to a power limitation. Hence, the AT cannot use a plurality of Radio Frequency (RF) transmit chains which consume considerable power, such as a power amplifier, at the same time to maximize the power efficiency. Accordingly, to overcome the power limitation of the AT and adopt the SM and the SDMA, there is a need for an apparatus and a method for performing the SDMA using a single RF receive chain at the AT.

SUMMARY OF THE INVENTION

An aspect of the present invention is to address at least the above mentioned problems and/or disadvantages and to provide at least the advantages described below. Accordingly, an aspect of the present invention is to provide an apparatus and a method for maximizing an uplink signal transmission capacity in a Multiple Input Multiple Output (MIMO) wireless communication system.

Another aspect of the present invention is to provide an apparatus and a method for forming a beam to transmit an uplink signal and for performing an uplink Space-Division Multiple Access (SDMA) based on the beamforming in a MIMO wireless communication system.

According to one aspect of the present invention, an operating method of a terminal in a MIMO wireless communication system is provided. The method includes transmitting sounding signals beamformed through a plurality of beamforming weight vectors in sequence, receiving control information indicative of an uplink weight vector determined by a base station and a maximum channel quality value using the sounding signals and transmitting a transmit signal beamformed with the uplink weight vector via a plurality of antennas.

According to another aspect of the present invention, an operating method of a base station in a MIMO wireless communication system is provided. The method includes receiving sounding signals beamformed through a plurality of beamforming weight vectors from a plurality of terminals respectively, estimating effective channel vectors corresponding to the beamformed sounding signals, determining channel quality values corresponding to the effective channel vectors and selecting at least one terminal for an uplink communication using the channel quality values.

According to yet another aspect of the present invention, an apparatus for a terminal in a MIMO wireless communication system is provided. The apparatus includes a beamformer for transmitting sounding signals beamformed through a plurality of beamforming weight vectors in sequence, an information restorer for determining control information indicative of an uplink weight vector determined by a base station and a maximum channel quality value using the sounding signals and a communication controller for controlling to beamform a transmit signal with the uplink weight vector.

According to still another aspect of the present invention, an apparatus for a base station in a MIMO wireless communication system is provided. The apparatus includes a channel estimator for receiving sounding signals beamformed through a plurality of beamforming weight vectors from a plurality of terminals respectively and for estimating effective channel vectors corresponding to the beamformed sounding signals, and a communication controller for determining channel quality values corresponding to the effective channel vectors and selecting at least one terminal for an uplink communication using the channel quality values.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for beamforming and uplink Space-Division Multiple Access (SDMA) transmission/reception based on beamforming in a Multiple Input Multiple Output (MIMO) wireless communication system.

Figure 1:
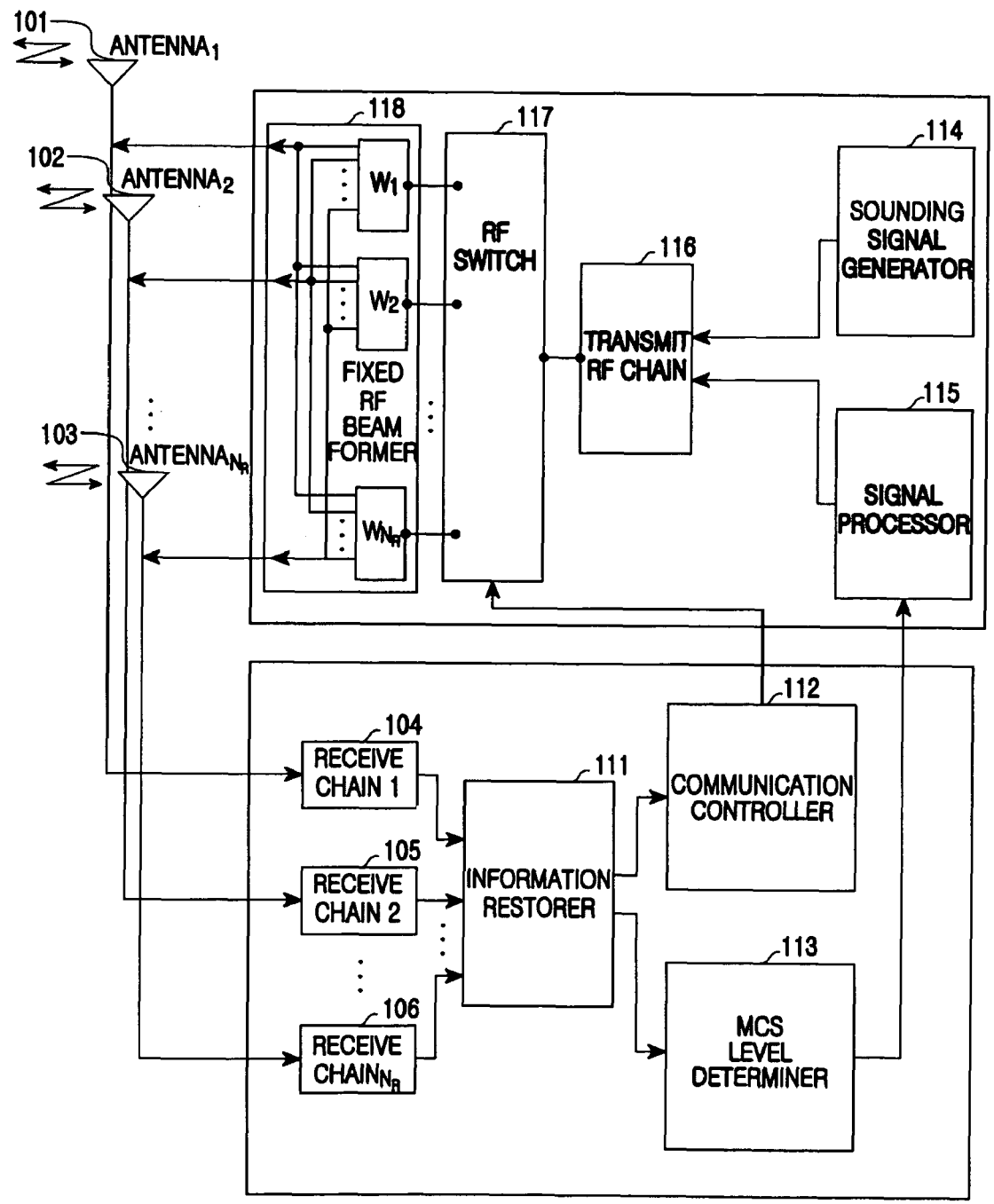
FIG. 1 illustrates a terminal in a Multiple Input Multiple Output (MIMO) wireless communication system according to an exemplary embodiment of the present invention.

FIG. 1 depicts a terminal in a MIMO wireless communication system according to an exemplary embodiment of the present invention. The terminal of FIG. 1 includes a plurality of transmit/receive antennas 101, 102 and 103, a plurality of receive chains 104, 105 and 106, an information restorer 111, a communication controller 112, a Modulation and Coding Scheme (MCS) level determiner 113, a sounding signal generator 114, a signal processor 115, a transmit Radio Frequency (RF) chain 116, an RF switch 117, and a fixed RF beamformer 118.

Referring to FIG. 1, the transmit/receive antennas 101, 102 and 103 receive downlink signals from a base station and provide the signals to the receive chains 104, 105 and 106. The transmit/receive antennas 101, 102 and 103 also transmit an uplink signal beamformed at the fixed RF beamformer 118 to the base station.

The receive chains 104, 105 and 106 convert the downlink signals output from the transmit/receive antennas 101, 102 and 103 into baseband signals and provide the baseband signals to the information restorer 111.

The information restorer 111 converts the baseband signals output from the receive chains 104, 105 and 106 into a bit stream. The information restorer 111 determines an optimum transmit weight vector index n* based on information from the bit stream and provides the optimum transmit weight vector index n* to the communication controller 112. Also, the information restorer 111 determines a Signal to Interference Noise Ratio (SINR) $\gamma_{k^*}$ for the optimum transmit weight vector of the terminal and provides the SINR $\gamma_{k^*}$ to the MCS level determiner 113.

The communication controller 112 selects a transmit path by controlling the RF switch 117. Herein, the communication controller 112 controls the RF switch 117 to set the transmit path with the optimum transmit weight vector index n* of the terminal provided from the information restorer 111.

The MCS level determiner 113 determines an MCS level corresponding to the SINR $\gamma_{k^*}$ of the optimum transmit weight of the terminal provided from the information restorer 111. The MCS level determiner 113 informs the signal processor 115 of the determined MCS level.

The sounding signal generator 114 generates a sounding signal. The sounding signal is a signal used to estimate an uplink channel. The sounding signal generated at the sounding signal generator 114 is applied to the transmit RF chain 116. Herein, the system needs the sounding signal because it is difficult for a time division system to determine an uplink beamforming weight which maximizes the SINR in the reverse link merely using downlink channel information. Further, in the SDMA with interference within the same cell, it is difficult to concurrently minimize the interference in the same cell and determine the weights to be transmitted merely using the downlink channel information received per terminal. Accordingly, even in a time division multiplexing system, the terminal cannot estimate the optimum weight which maximizes the SINR of the uplink through the downlink channel estimation and the uplink receive SINR. Therefore, since the reciprocity between the uplink channel and the downlink channel of the time division multiplexing system is unusable, the sounding signal should be transmitted to allow the base station to estimate the uplink channel and to determine the optimum weights based on the estimation.

The signal processor 115 generates a data signal to transmit by encoding and modulating traffic data and provides the data signal to the transmit RF chain 116. The signal processor 115 encodes and modulates the traffic data according to the MCS level corresponding to the receive SINR $\gamma_{k^*}$ provided from the MCS level determiner 113.

The transmit RF chain 116 converts the baseband signal including the traffic data output from the signal processor 115 and the sounding signal output from the sounding signal generator 114 to an RF signal. Before the transmit weight vectors are determined, the transmit RF chain 116 provides the sounding signal generated at the sounding signal generator 114 into the RF switch 117. After the transmit weight vectors are determined, the transmit RF chain 116 provides the traffic data signal from the signal processor 115 to the RF switch 117.

The RF switch 117 selects one of the weight vectors for the beamforming. More specifically, the RF switch 117 switches the signal transmission path to beamform the sounding signal or the traffic data signal output from the transmit RF chain 116 using one of the beamforming weights. Before the transmit weight vectors are determined, the RF switch 117 receives the sounding signal from the transmit RF chain 116 and forwards the received sounding signal to the RF beamformer 118. In so doing, the RF switch 117 switches the path for the beamforming by applying all of the weight vectors in sequence. After the transmit weight vectors are determined, the RF switch 117 receives the data signal from the transmit RF chain 116 and provides the received data signal to the RF beamformer 118. In so doing, the RF switch 117 keeps the path to form the beam with the determined transmit weight vectors.

The fixed RF beamformer 118 includes a plurality of preset beamforming weights. The fixed RF beamformer 118 forms the beam using one of the beamforming weights and transmits the beamformed signal to the base station over $n_R$-ary antennas. Before the transmit weight vectors are determined, the fixed RF beamformer 118 receives the sounding signal from the RF switch 117, forms the beam by applying the beamforming weights in sequence, and sequentially outputs the beamformed sounding signals. After the transmit weight vectors are determined, the fixed RF beamformer 118 beamforms the data signal output from the RF switch 117 using the beamforming weight corresponding to the index of the optimum transmit weight vector provided from the communication controller 112. More specifically, the fixed RF beamformer 118 beamforms the data signal fed from the signal processor 115 using the beamforming weight vector selected by the RF switch 117 among the $n_R$-ary beamforming weight vectors. Herein, the $n_R$-ary weights of the size $n_R \times 1$ should meet a condition of Equation (1).

$$W_i^H W_j = \delta_{i,j}, \ i, j = 1, \ldots, n_R, \tag{1}$$

$$\delta_{i,j} = \begin{cases} 1, & \text{if } i = j \\ 0, & \text{if } i \neq j \end{cases}$$

In Equation (1), $W_j$ denotes the j-th beamforming weight vector and $n_R$ denotes the number of the transmit antennas.

Namely, the $n_R$-ary fixed weights used by the fixed RF beamformer 118 should be orthogonal to one another.

Figure 2:
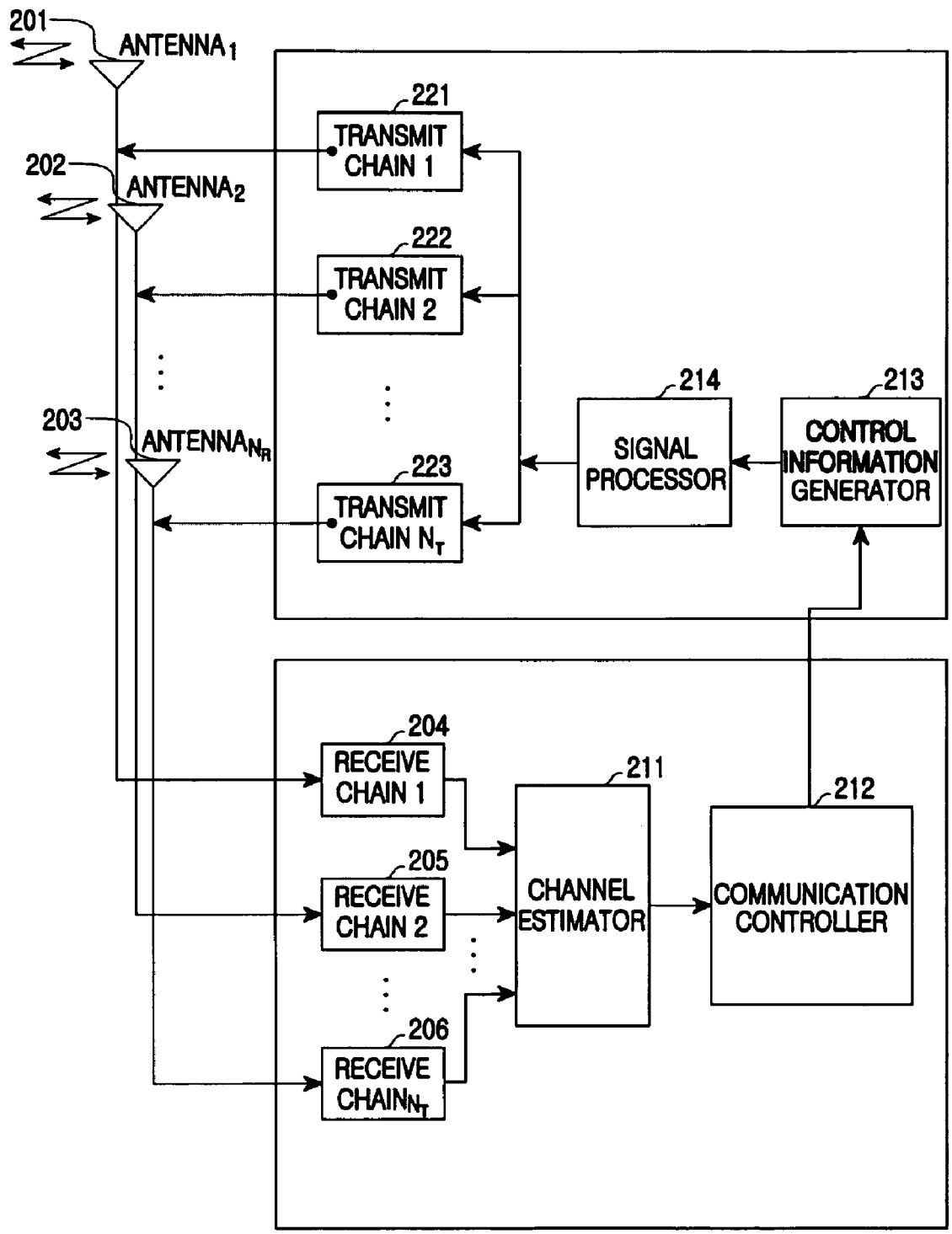
FIG. 2 illustrates a base station in a MIMO wireless communication system according to an exemplary embodiment of the present invention.

FIG. 2 depicts a base station in a MIMO wireless communication system according to an exemplary embodiment of the present invention. The base station of FIG. 2 includes a plurality of transmit/receive antennas 201, 202 and 203, a plurality of receive chains 204, 205 and 206, a channel estimator 211, a communication controller 212, a control information generator 213, a signal processor 214, and a plurality of transmit chains 221, 222 and 223.

Referring to FIG. 2, the transmit/receive antennas 201, 202 and 203 receive uplink signals from terminals and provide the received uplink signals to the receive chains 204, 205 and 206. The transmit/receive antennas 201, 202 and 203 receive downlink signals from the transmit chains 221, 222 and 223 and transmit the downlink signals to the terminals.

The receive chains 204, 205 and 206 convert the uplink signals fed from the antennas 201, 202 and 203 into baseband signals and provide the converted baseband signals to the channel estimator 211. In a case where the system utilizes the signal not yet converted into the baseband signal in the channel estimation, the receive chains 204, 205 and 206 can convert the signals into band signals for the channel estimation.

The channel estimator 211 estimates uplink effective channel vectors $\{h_{k,n}\} n=1, \ldots, n_n$ per transmit weight of the terminals using the sounding signal of the signals provided from the receive chains 204, 205 and 206, and provides the estimated uplink effective channel vectors $\{h_{k,n}\} n=1, \ldots, n_n$ to the communication controller 212. The uplink effective channel vectors are generated based on Equation (2).

$$h_{k,n} = H_k W_n \tag{2}$$

In Equation (2), $H_k$ denotes a $n_T \times n_R$-size matrix indicative of a channel response from $n_R$-ary transmit antennas of the k-th terminal to $n_T$-ary receive antennas of the base station, $W_n$ denotes the transmit weight vectors, and $h_{k,n}$ denotes the uplink effective channel vectors when the k-th terminal uses the transmit weight vectors $W_n$.

The communication controller 212 estimates SINRs $\{\gamma_{k,n}\} n=1, \ldots, n_n$ per weight vector of each terminal using the uplink channel vectors $h_{k,n}$, other cell interference, and receive noise. The communication controller 212 determines optimum transmit weight vectors $\{w_{k,n^*}\} k=1, \ldots, K$ which maximize the SINR of each terminal using the SINRs per weight of the terminals, and determines maximum receive SINRs $\{\gamma_k\} k=1, \ldots, K$ corresponding to the optimum transmit weight vectors. In other words, the communication controller 211 estimates the transmit weight vectors $\{w_{k,n^*}\} k=1, \ldots, K$ which maximize the uplink receive SINR with respect to the terminals and the maximum receive SINRs $\{\gamma_k\} k=1, \ldots, K$. The transmit weight vectors which maximize the uplink receive SINR of each terminal are estimated based on Equation (3).

$$W_{k,n^*} = \underset{\{W_n\}_{n=1,\ldots,n_R}}{\operatorname{argmax}} \gamma_{k,n} \tag{3}$$

In Equation (3), $\gamma_{k,n}$ denotes the SINR of the n-th weight vector of the k-th terminal, $\{W_n\} n=1, \ldots, n_R$ denotes the $n_R$-ary weight vectors of the terminals, and $W_{k,n^*}$ denotes the transmit weight vectors which maximize the uplink SINRs of the terminals.

The communication controller 212 selects one terminal of the maximum priority according to a schedule algorithm using the transmit weights which maximize the SINR per terminal. For example, using a Proportional Fairness (PF) algorithm, the communication controller 212 selects the k*-th terminal to which the signal is transmitted based on Equation (4).

$$k^* = \underset{k=1,\ldots,K}{\operatorname{argmax}} \frac{R_k(\gamma_k)}{\overline{R}_k} \tag{4}$$

In Equation (4), $R_k(\gamma_k)$ denotes a possible data rate through the optimum weight $W_{k,n^*}$ in the uplink of the k-th terminal, and $\overline{R}_k$ denotes an average data rate of the uplink of the k-th terminal.

The communication controller 212 informs the control information generator 213 of the transmit weight vector index n* which maximizes the uplink SINR of the k*-th terminal selected using the scheduling algorithm, and the maximum SINR $\gamma^*_k$.

In the SDMA based on beamforming, since there are multiple terminals desiring uplink communication, the base station needs to select terminals for uplink communication. In so doing, the communication controller 212 performs a multiuser scheduling. The multiuser scheduling is executed by considering all terminals which transmit the uplink signal and the weights to be used by the terminals to meet a scheduling criterion. For example, when the scheduling criterion is to maximize the uplink transmission capacity of the system, the multiuser scheduling determines which of the K-ary terminals, and which uplink beamformed weights, will maximize the system transmission capacity in the uplink signal transmission. Since each terminal transmits only one data signal, the number of terminals transmiting the signal at the same time is equal to the number of uplink signals transmitted at the same time within the same cell. When the base station includes $n_T$-ary receive antennas, $n_T$-ary data signals at maximum can be transmitted in the same cell through the uplink SDMA. That is, the $n_T$-ary terminals at maximum can transmit the uplink data signals at the same time.

An optimum terminal set A* satisfying the scheduling criterion and an optimum beamforming weight vector set W* to be used by the terminals belonging to A* vary depending on the number of the receive antennas $n_T$ of the base station, the number of the users K in the cell, and a spatial correlation of the uplink channel. To determine the optimum A* and W*, the base station considers every possible terminal set while increasing the number of the terminals l of the simultaneous transmission from 1 to $n_T$. The number of cases of every possible data transmission terminal set with the number of the terminals l which transmit the signal at the same time is $_KC_l$, ($_KC_l$=k!/(l!(K−l)!). Thus, when the number of terminals which transmit the signal at the same time is l, the number of data transmission terminal sets under consideration is $\{A_m^l\}$m=1, ..., $_KC_l$. With respect to the transmission terminal set $A_m^l$ under consideration, the base station takes into account every case in which the terminals belonging to $A_m^l$ can use the $n_R$-ary transmit weights. More specifically, with respect to the terminal set $A_m^l$ of the m-th case in which the l-ary terminals transmit the signals, each terminal belonging to $A_m^l$ is able to use one of the $n_R$-ary transmit weights. As a result, the number of weight sets to be considered is $nR^l$ in total. That is, the base station needs to estimate the weight sets $\{W_x(A_m^l)\}$x=1, ..., $nR^l$ in relation with $A_m^l$. Hence, when the SDMA is supported, the communication controller 212 determines and provides the optimum terminal set and the optimum weight set in the SDMA to the control information generator 213. The operations of the communication controller 212 for determining the optimum terminal set and the optimum weight set in the SDMA shall be elucidated below by referring to FIG. 5.

The control information generator 213 generates control information including the information provided from the communication controller 212 and provides the generated control information to the signal processor 214. When a single terminal transmits a signal through beamforming, the control information generator 213 generates the control information including one optimum transmit weight vector index n* information and one maximum receive SINR $\gamma_{k*}$ information. In contrast, when a plurality of terminals transmit signals according to the SDMA, the control information generator 213 generates the control information including the optimum transmit weight set W* information and the optimum terminal set A* information.

The signal processor 214 generates a control signal for transmission by encoding and modulating the control information bit stream and provides the control signal to the transmit chains 221, 222 and 223. When a single terminal transmits a signal through beamforming, the signal processor 214 generates the control signal including the one optimum transmit weight vector index n* and the one maximum receive SINR $\gamma_{k*}$ provided from the control information generator 213. In contrast, when a plurality of terminals transmit signals according to the SDMA, the signal processor 214 generates the control signal including the optimum transmit weight set W* and the optimum terminal set A* provided from the control information generator 213.

The transmit chains 221, 222 and 223 transmit the control information signal to a single terminal or a plurality of terminals. When a single terminal transmits a signal through beamforming, the transmit chains 221, 222 and 223 transmit the control signal including the one optimum transmit weight vector index n* and the one maximum receive SINR $\gamma_{k*}$ provided from the signal processor 214, to the k*-th terminal. In contrast, when a plurality of terminals transmit signals according to the SDMA, the transmit chains 221, 222 and 223 transmit the control signals including the optimum transmit weight set W* information and the optimum terminal set A* information provided from the signal processor 214, to the terminals belonging to the terminal set.

Figure 3:
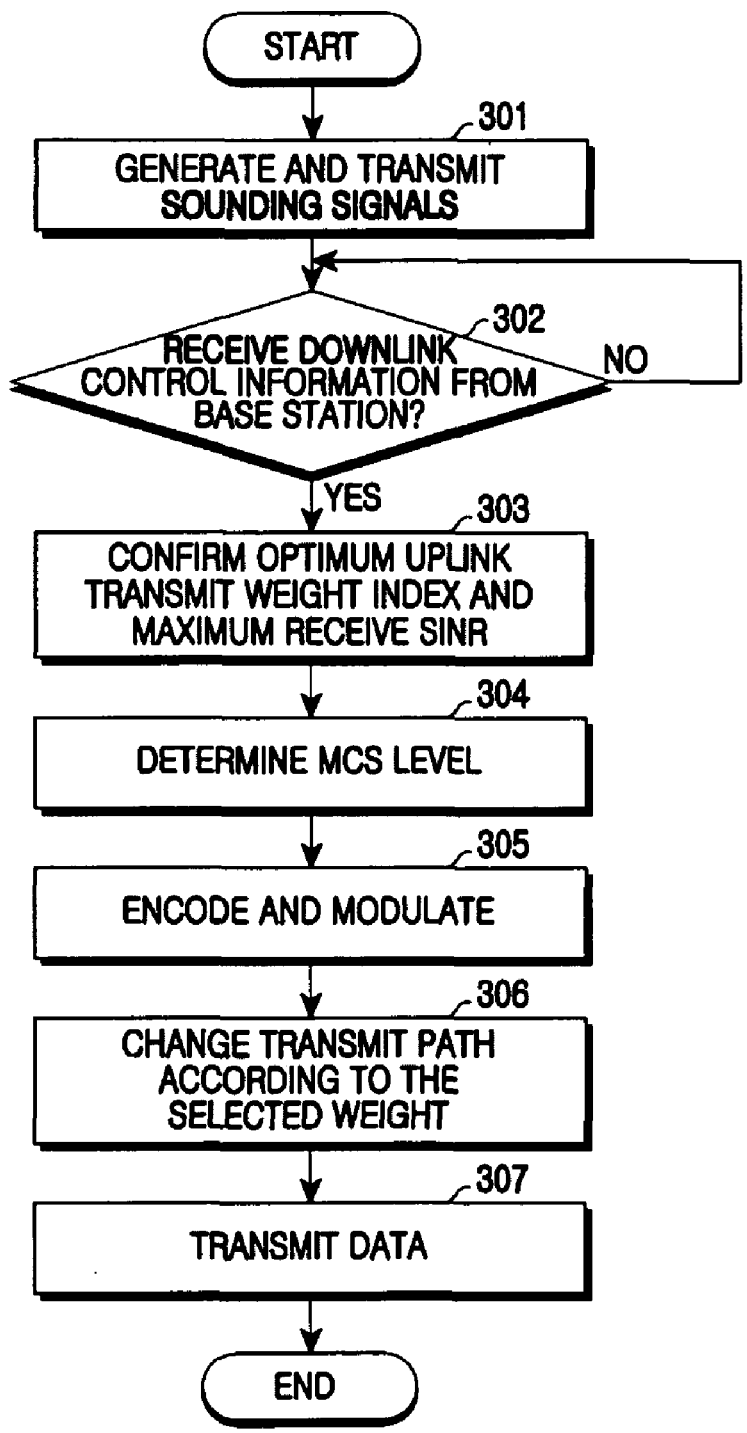
FIG. 3 illustrates beamforming and Space-Division Multiple Access (SDMA) processes of a terminal according to an exemplary embodiment of the present invention.

FIG. 3 is a flowchart outlining an uplink communication process of a terminal in a MIMO wireless communication system according to an exemplary embodiment of the present invention.

Referring to FIG. 3, in step 301, the terminal generates and transmits the sounding signal. The terminal generates the sounding signal and beamforms the sounding signal using the beamforming weight vectors. The terminal transmits the beamformed sounding signals to the base station in sequence. In an exemplary implementation, the beamforming weight vectors are preset and stored at the terminal.

In step 302, the terminal determines whether the control information is received from the base station. If the control information is not received, the terminal repeats step 302 and again determines whether the control information is received.

If the control information is received, in step 303 the terminal determines the optimum uplink transmit weight index n* and the corresponding maximum receive SINR $\gamma_{k*}$ which are determined by the base station from the received control information.

In step 304, the terminal determines the MCS level to be applied to the transmit data using the determined maximum receive SINR $\gamma_{k*}$. Herein, the MCS level is determined by referring to an MCS table including the SINR and the modulation and coding scheme information.

In step 305, the terminal encodes and modulates the data at the determined MCS level. That is, the terminal constitutes the baseband signal by encoding and modulating the data.

In step 306, the terminal sets the transmission path corresponding to the optimum uplink transmit weight vector determined in step 303. Thus, the subsequent data signals to be transmitted are beamformed with the selected beamformed weight.

In step 307, the terminal transmits the data. In so doing, the terminal beamforms the data using the optimum transmit weight vector. Next, the terminal transmits the beamformed data signal to the base station.

Figure 4:
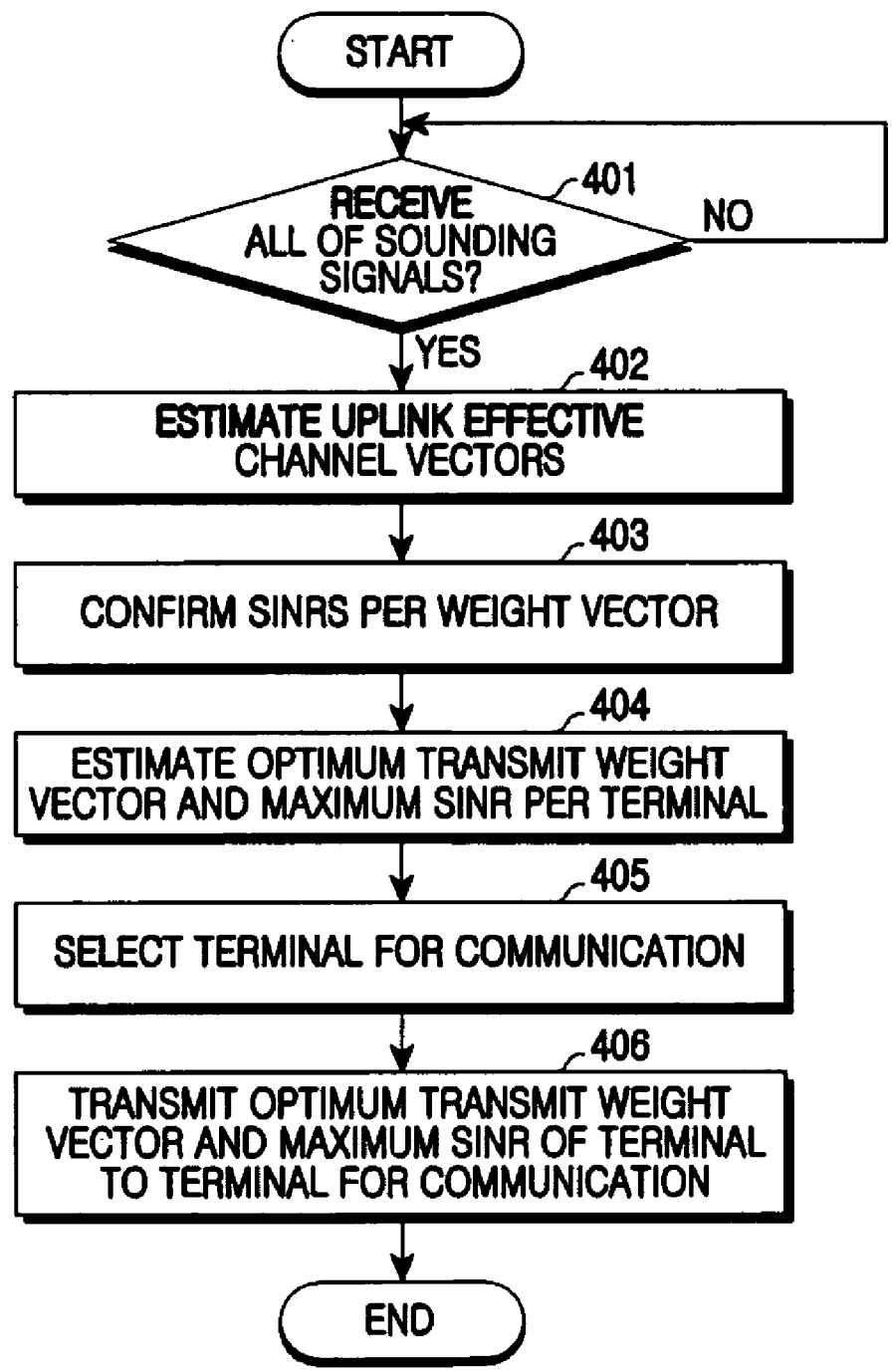
FIG. 4 illustrates a beamforming process of a base station according to an exemplary embodiment of the present invention.

FIG. 4 is a flowchart outlining operations of a base station in a MIMO wireless communication system according to an exemplary embodiment of the present invention.

Referring to FIG. 4, in step 401, the base station determines whether all of the sounding signals are received from the $n_R$-ary weight vectors of the K-ary terminals in step 401. Herein, since each individual terminal uses the $n_R$-ary weight vectors, the total number of the sounding signals is $n_R \times K$.

When receiving all of the sounding signals from the K-ary terminals, the base station estimates the uplink effective channel vectors $\{h_{k,n}\} n=1, \ldots, n_n$ of the terminals using the sounding signals received from the K-ary terminals in step 402.

In step 403, the base station estimates the SINRs $\{\gamma_{k,n}\} n=1, \ldots, n_n$ per weight vector of each terminal by taking into account the uplink effective channel vectors $\{h_{k,n}\} n=1, \ldots, n_n$ estimated from each terminal, other cell interference, and receive noise.

In step 404, the base station estimates the optimum transmit weight vectors $\{W_{k,n^*}\} k=1, \ldots, K$ per terminal. That is, the base station estimates the optimum transmit weight vector per terminal which maximizes the SINR of each terminal. For doing so, the base station examines the maximum SINR per terminal and determines the transmit weight vector corresponding to the maximum SINR. The optimum transmit weight vector estimation can be expressed as Equation (3).

In step 405, the base station selects the k*-th terminal for the uplink communication. The k*-th terminal for the uplink communication is selected as the terminal having maximum priority according to the scheduling algorithm of the base station. For example, using the PF algorithm, the base station selects the k*-th terminal for uplink communication based on Equation (4).

In step 406, the base station transmits the control information including the optimum transmit weight vector index n* information which maximizes the SINR in the uplink and the corresponding maximum receive SINR $\gamma_{k^*}$ information to the k*-th terminal. Hence, the k*-th terminal, receiving the control information, conducts the uplink communication with the weight corresponding to the optimum transmit weight index. In step 406, since the transmit weight vectors are correspond to the sounding signals, the base station may include sounding signal index into the control information, instead of the transmit weight vector index.

Figure 5:
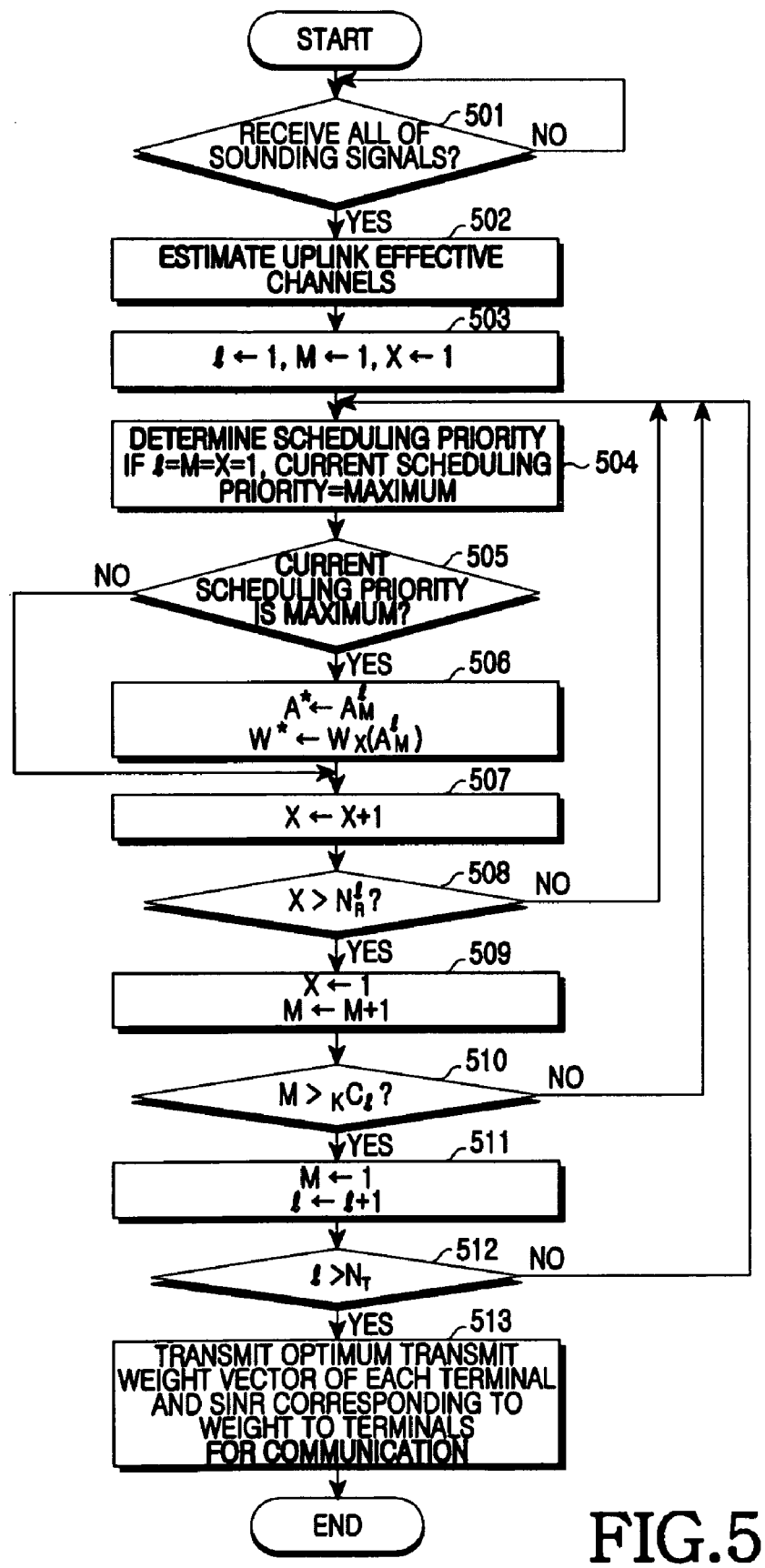
FIG. 5 illustrates an SDMA method using beamforming at a base station according to an exemplary embodiment of the present invention.

FIG. 5 is a flowchart outlining operations of a base station in a MIMO wireless communication system according to an exemplary embodiment of the present invention.

Referring to FIG. 5, in step 501, the base station determines whether the sounding signals beamformed with the $n_R$-ary weight vectors are received from the K-ary terminals. Herein, since the individual terminal uses the $n_R$-ary weight vectors, the total number of the sounding signals received is $n_R \times K$.

When receiving all of the sounding signals from the K-ary terminals, the base station estimates the uplink effective channel vectors $\{h_{k,n}\} n=1, \ldots, n_n$ per weight vector of the terminals using the sounding signals received from the K-ary terminals in step 502.

In step 503, the base station initializes the variable l indicative of the number of the terminals in the uplink communication to '1' and initializes the index m of the possible terminal set in a case where the number of the terminals simultaneously transmitting the signal is l to '1'. Also, in relation with the terminal set $A_m^l$, the base station initializes the index x of the weight set to be considered to '1'.

In step 504, the base station determines the scheduling priority $p(A_m^l, W_x(A_m^l))$ according to the scheduling algorithm when the terminal set $A_m^l$ utilizes the weight set $W_x(A_m^l)$. For example, using the scheduling algorithm which maximizes the system transmission capacity, the base station determines a sum throughput corresponding to the case where the weight set $W_x(A_m^l)$ is applied to the terminal set $A_m^l$. If all of the values l, m and x are '1', the base station sets the current scheduling priority to the maximum.

In step 505, the base station determines whether the scheduling priority $p(A_m^l, W_x(A_m^l))$ determined in step 504 is the maximum. When the scheduling priority determined in step 504 is the maximum, the base station determines $A_m^l$ and $W_x(A_m^l)$ as the optimum terminal set and the optimum weight set in step 506. Namely, the optimum terminal set and the optimum weight set are determined by repeating the steps 505 through 512 while increasing x to $nR^l$, m to $_kC_l$, and l to $n_T$.

Meanwhile, when the scheduling priority determined in step 504 is not the maximum, the base station updates the new x with x+1 in step 507.

In step 508, the base station determines whether the current x is greater than the total number of the weight sets to be considered. Herein, the total number of the weight sets to be considered is $n_R^l$. That is, the base station needs to consider the weight sets $\{W_x(A_m^l)\} x=1, \ldots, nR^l$ with respect to $A_m^l$. When x is less than $nR^l$, the base station returns to step 504 and determines the scheduling priority in the case where the weight set corresponding to the current x is applied.

When x is greater than $nR^l$, the base station initializes x to '1' and updates the new m with m+1 in step 509.

In step 510, the base station determines whether the current m is greater than the total number of the terminal sets $_kC_l$. When m is less than $_kC_l$, the base station returns to step 504 and determines the scheduling priority of the terminal set having the current m as its index.

When m is greater than $_kC_l$, the base station initializes m to '1' and updates the new l with l+1 in step 511.

In step 512, the base station determines whether the current l is greater than the number of the antennas $n_T$ of the base station. When l is smaller than $n_T$ the base station returns to step 504 and determines the scheduling priority of the terminal set having the current m as its index.

When l is greater than $n_T$, in step 513 the base station selects the terminals belonging to the terminal set having the current m as the index as the terminals of the uplink communication, and transmits the control information indicative of the optimum transmit weight vectors to be used by the selected terminals and the receive SINRs corresponding to the weight vectors. Herein, the optimum transmit weight vectors to be used by the selected terminals are the weight set having the current x as the index. In step 513, the optimum transmit weight vectors is indicated by one of the transmit weight vector index and the sounding signal index in the control information.

Figure 6:
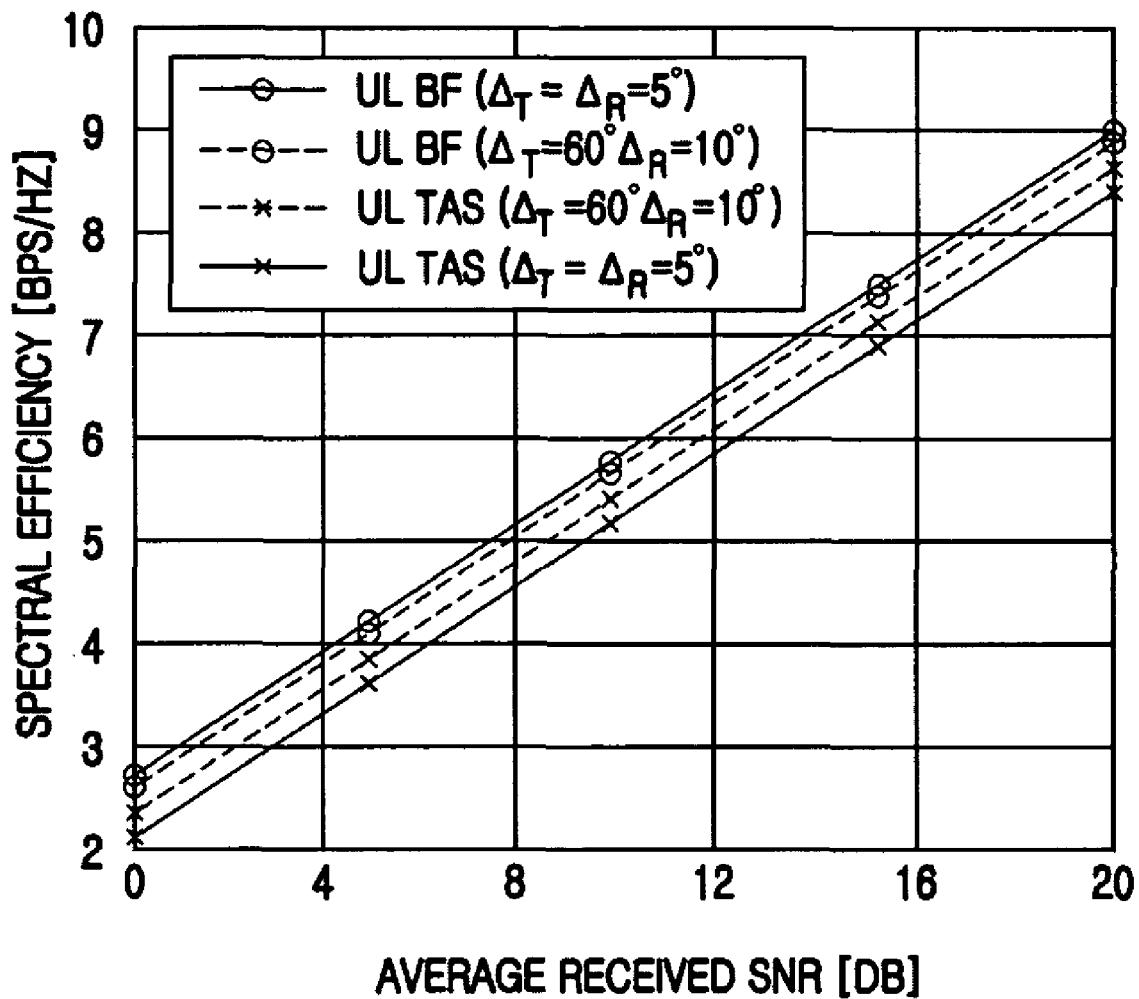
FIG. 6 illustrates simulation results of beamforming performance with a single terminal and a single base station according to an exemplary embodiment of the present invention.

FIG. 6 is a graph showing simulation results of the beamforming performance with a single terminal and a single base station according to an exemplary embodiment of the present invention.

In FIG. 6, the performance of the present beamforming technique is analyzed by comparison with the uplink Transmit Antenna Selection (TAS) technique in the uplink MIMO channel environment of various spatial correlations. In the uplink TAS technique, the base station selects the transmit antenna of the terminal which maximizes the uplink channel gain in sequence through the uplink channel estimation and informs the terminal of the selected transmit antenna and the corresponding SINR over the downlink signaling channel, and the terminal transmits the traffic via the selected transmission antenna. The uplink TAS utilizes the same channel estimation and the same signaling as the present uplink beamforming method. Correspondingly, the present uplink beamforming method changes the transmit antenna domain of the uplink TAS to the transmit weight domain.

Consideration is given to the MIMO antenna link between one transmitter and the receiver when the number of the transmit antennas of the terminal is '2' with the antenna interval 0.5λ and the number of the receive antennas $n_T$ of the base station is '4' with the antenna interval 10λ. The uplink beamforming weight vector used takes advantage of two column vectors of a Discrete Fourier Transform (DFT) matrix as expressed in Equation (5) satisfying the condition of Equation (1).

$$[w_1 \ w_2] = \frac{1}{\sqrt{2}}\begin{bmatrix} 1 & 1 \\ 1 & -1 \end{bmatrix} \quad (5)$$

In Equation (5), $w_1$ and $w_2$ denote the column vectors.

The throughputs acquired by generating the MIMO channel coefficient for 10,000 times are averaged and used as the performance measure. In the channel coefficient generation, Angle of Departure (AOD) of the transmitting end of the terminal and the Angle of Arrival (AOS) of the receiving end of the base station are uniform within (−60°, 60°). The MIMO channel of the spatial correlation is established based on Equation (6) in every channel generation, and the spatial correlation matrix $R_T$ of the transmitting end of the terminal and the spatial correlation matrix $R_R$ of the receiving end of the terminal are obtained by employing a linear array antenna and a model in which the angular spectrum is uniformly distributed based on the AOD and the AOA by $\Delta_T$ and $\Delta_R$. The uplink channel matrix of the k-th terminal is acquired as below.

$$H_k = R_R^{\frac{1}{2}} H_w R_T^{\frac{1}{2}} \quad (6)$$

In Equation (6), $R_T$ denotes the spatial correlation matrix at the transmitting end of the terminal and $R_R$ denotes the spatial correlation matrix at the receiving end of the terminal. $H_w$ denotes a $n_T \times n_R$-size complex Gaussian matrix without correlation. Consideration is given to a case of $\Delta_T = \Delta_R = 5°$ representing the high spatial correlation such as Line of Sight (LOS) and a case of $\Delta_T = 60°$, $\Delta_R = 10°$ representing the low spatial correlation such as Non LOS (NLOS).

The uplink beamforming in FIG. 6 exhibits higher gain for the lower $\Delta_T$ and a gain of more than 2 dB or so in terms of the capacity even at the considerable $\Delta_T$, compared to the uplink TAS.

Figure 7:
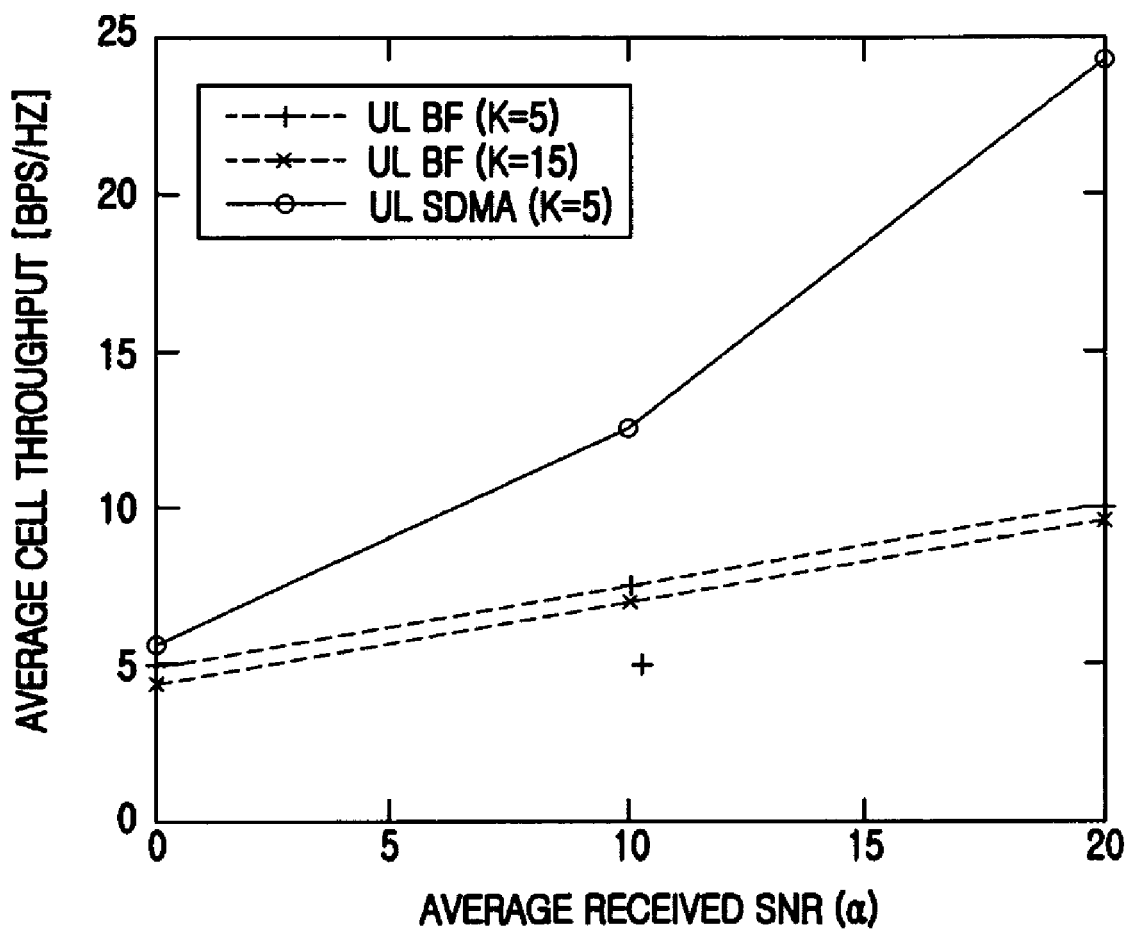
FIG. 7 illustrates an average cell throughput using beamforming and an uplink SDMA according to an exemplary embodiment of the present invention.

FIG. 7 is a graph comparing an average cell throughput of the beamforming and the uplink SDMA according to an exemplary embodiment of the present invention. The graph of FIG. 7 takes into account a single cell including K-ary uplink transmitters when the number of the transmit antennas $n_R$ of the terminal is '2' with the antenna interval 0.5λ and the number of the receive antennas $n_T$ of the base station is '4' with the antenna interval 0.5λ. It is assumed that every average SINR received from the K-ary uplink transmitters is α, and that $\Delta_T = 5°$, $\Delta_R = 60°$ is given for the K-ary uplinks. It is assumed that the base station employs a MMSE-SIC receiver, and that there exists no interference between the streams delivered at the same time in the SDMA. When K is '5', the SDMA according to an exemplary embodiment of the present invention exhibits a much higher throughput than the beamforming of the K '5' or '15'. Further, as the average SINR increases, the throughput gain of the SDMA also increases. When the average SINR increases, the number of the terminals transmitting the data stream at the same time rises in the SDMA. To the contrary, the number of terminals simultaneously transmitting the data at the same time within the cell is fixed to '1' in beamforming.

As set forth above, a terminal in the MIMO wireless communication system can maximize the channel quality by means of beamforming. In particular, the transmission capacity of the uplink can be maximized by carrying out the uplink SDMA based on the beamforming of the terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a terminal in a Multiple Input Multiple Output (MIMO) wireless communication system, the method comprising:
   transmitting sounding signals beamformed using a plurality of beamforming weight vectors in sequence;
   receiving control information indicative of an uplink weight vector and a maximum channel quality value which are determined by a base station using the sounding signals; and
   transmitting a transmit signal beamformed with the uplink weight vector via a plurality of antennas.

2. The method of claim 1, further comprising:
   generating the transmit signal by encoding and modulating transmit data according to a Modulation and Coding Scheme (MCS) level corresponding to the maximum channel quality value.

3. The method of claim 1, wherein the beamforming weight vectors are preset and stored at the terminal.

4. The method of claim 1, wherein the uplink weight vector is indicated by one of the transmit weight vector index and the sounding signal index in the control information.

5. An operating method of a base station in a Multiple Input Multiple Output (MIMO) wireless communication system, the method comprising:
   receiving sounding signals beamformed through a plurality of beamforming weight vectors from a plurality of terminals respectively;
   estimating effective channel vectors corresponding to the beamformed sounding signals;
   determining channel quality values corresponding to the effective channel vectors; and
   selecting at least one terminal for an uplink communication using the channel quality values.

6. The method of claim 5, wherein the selecting of the at least one terminal comprises:
   estimating an optimum beamforming weight vector corresponding to a maximum channel quality value and the maximum channel quality value with respect to each terminal;
   determining a data rate using the optimum beamforming weight vector of each terminal and an uplink average data rate of each terminal; and
   selecting a single terminal having a maximum ratio of the data rate using the optimum beamforming weight vector and the average data rate, as the terminal for the uplink communication.

7. The method of claim 6, further comprising:
transmitting control information indicative of the optimum beamforming weight vector and the maximum channel quality value to the selected terminal.

8. The method of claim 7, wherein the optimum beamforming weight vector is indicated by one of the transmit weight vector index and the sounding signal index in the control information.

9. The method of claim 5, wherein the selecting of the at least one terminal comprises:
constituting every possible candidate terminal set from all of the terminals transmitting the sounding signal, and every possible candidate weight combination;
determining sum throughputs corresponding to cases in which the candidate weight combinations are applied to the candidate terminal sets; and
selecting the candidate terminal set corresponding to a maximum sum throughput to a terminal set for the uplink communication.

10. The method of claim 9, further comprising:
transmitting control information indicative of beamforming weight vectors of the weight combination corresponding to the maximum sum throughput and channel quality values corresponding to the beamforming weight vectors.

11. An apparatus for a terminal in a Multiple Input Multiple Output (MIMO) wireless communication system, the apparatus comprising:
a beamformer for transmitting sounding signals beamformed using a plurality of beamforming weight vectors in sequence;
an information restorer for determining control information indicative of an uplink weight vector and a maximum channel quality value which are determined by a base station using the sounding signals; and
a communication controller for controlling to beamform a transmit signal with the uplink weight vector.

12. The apparatus of claim 11, further comprising:
a signal processor for generating the transmit signal by encoding and modulating transmit data according to a Modulation and Coding Scheme (MCS) level corresponding to the maximum channel quality value.

13. The apparatus of claim 11, wherein the beamformer stores the preset beamforming weight vectors.

14. The apparatus of claim 11, wherein the uplink weight vector is indicated by one of the transmit weight vector index and the sounding signal index in the control information.

15. An apparatus for a base station in a Multiple Input Multiple Output (MIMO) wireless communication system, the apparatus comprising:
a channel estimator for receiving sounding signals beamformed through a plurality of beamforming weight vectors from a plurality of terminals respectively, and for estimating effective channel vectors corresponding to the beamformed sounding signals; and
a communication controller for determining channel quality values corresponding to the effective channel vectors, and for selecting at least one terminal for an uplink communication using the channel quality values.

16. The apparatus of claim 15, wherein the communication controller estimates an optimum beamforming weight vector corresponding to a maximum channel quality value and the maximum channel quality value with respect to each terminal, determines a data rate using the optimum beamforming weight vector of each terminal and an uplink average data rate of each terminal, and selects a single terminal having a maximum ratio of the data rate using the optimum beamforming weight vector and the average data rate, as the terminal for the uplink communication.

17. The apparatus of claim 16, further comprising:
a generator for generating control information indicative of the optimum beamforming weight vector and the maximum channel quality value.

18. The apparatus of claim 17, wherein the optimum beamforming weight vector is indicated by one of the transmit weight vector index and the sounding signal index in the control information.

19. The apparatus of claim 15, wherein the communication controller constitutes every possible candidate terminal set from all of the terminals transmitting the sounding signal and every possible candidate weight combination, determines sum throughputs corresponding to cases in which the candidate weight combinations are applied to the candidate terminal sets, and selects the candidate terminal set corresponding to a maximum sum throughput as a terminal set for the uplink communication.

20. The apparatus of claim 19, further comprising:
a generator for generating control information indicative of beamforming weight vectors of the weight combination corresponding to the maximum sum throughput and channel quality values corresponding to the beamforming weight vectors.

* * * * *